United States Patent [19]

Johnston

[11] Patent Number: 4,712,287

[45] Date of Patent: Dec. 15, 1987

[54] METHOD OF ASSEMBLING A VEHICLE FROM MODULAR COMPONENTS

[75] Inventor: Norman W. Johnston, Perrysburg, Ohio

[73] Assignee: Libbey-Owens-Ford Co., Toledo, Ohio

[21] Appl. No.: 866,446

[22] Filed: May 23, 1986

[51] Int. Cl.⁴ .................................................. B23P 25/00
[52] U.S. Cl. ........................................ 29/469; 29/458; 52/716
[58] Field of Search .................. 29/458, 469; 52/400, 52/402, 403, 716, 208, 398, 399; 296/84 R, 196, 84 M, 84 D, 192; 160/371

[56] References Cited

U.S. PATENT DOCUMENTS

| | | | |
|---|---|---|---|
| 3,783,568 | 1/1974 | Adler et al. | 296/84 |
| 3,843,982 | 10/1974 | Lane et al. | 160/371 |
| 4,072,340 | 2/1978 | Morgan | 160/371 |
| 4,249,517 | 2/1981 | Schroeder et al. | 52/400 |
| 4,332,413 | 6/1982 | Erion | 296/146 |
| 4,364,595 | 12/1985 | Morgan et al. | 296/146 |
| 4,487,448 | 12/1984 | Griffin | 296/84 R |

Primary Examiner—Howard N. Goldberg
Assistant Examiner—Irene Graves Golabi
Attorney, Agent, or Firm—Marshall & Melhorn

[57] ABSTRACT

A method of assembling a vehicle includes the steps of forming a plurality of different modular window assemblies each having at least one sheet of transparent material upon which a gasket has been formed. A windshield module can include a peripheral gasket, integral leaf screen and a hinged sun roof. A door module can include a peripheral gasket and bracket attached to a window installed in a door. A rear window module can include hinged side windows and a roof panel. After the modules have been formed, they are then assembled to a vehicle body.

31 Claims, 11 Drawing Figures

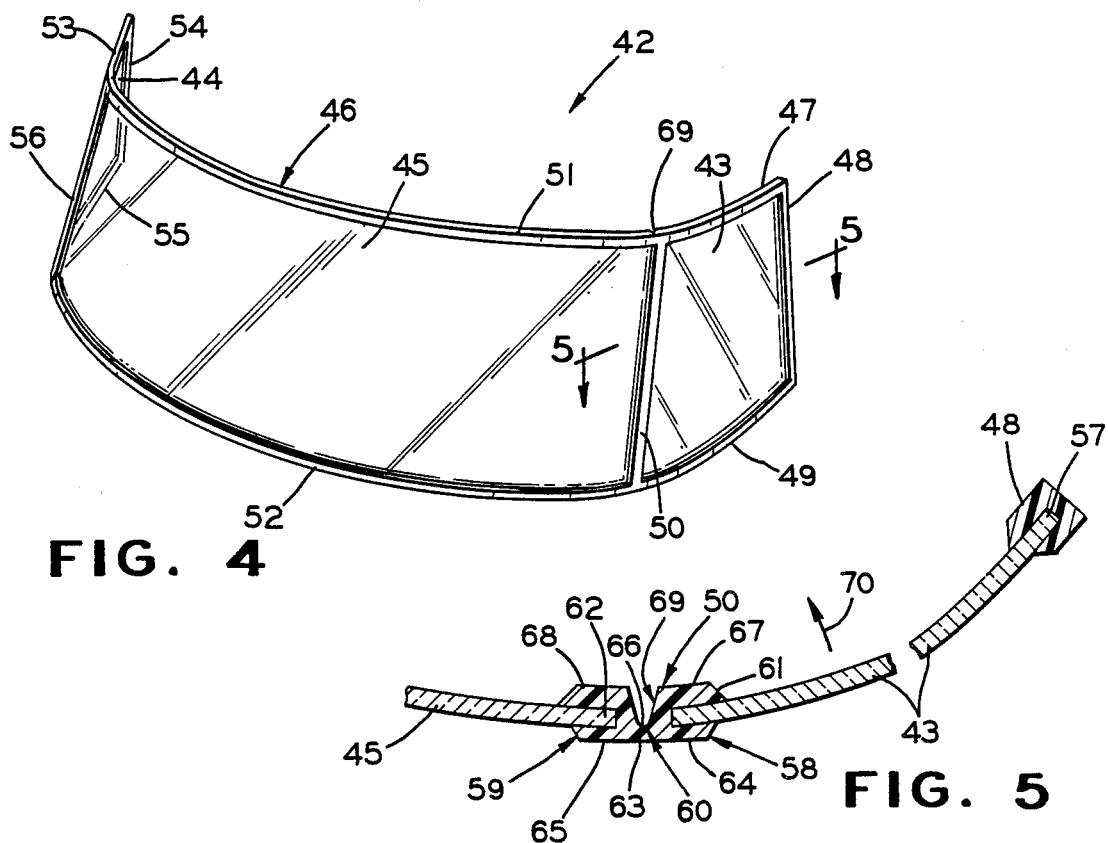
FIG. 4
FIG. 5
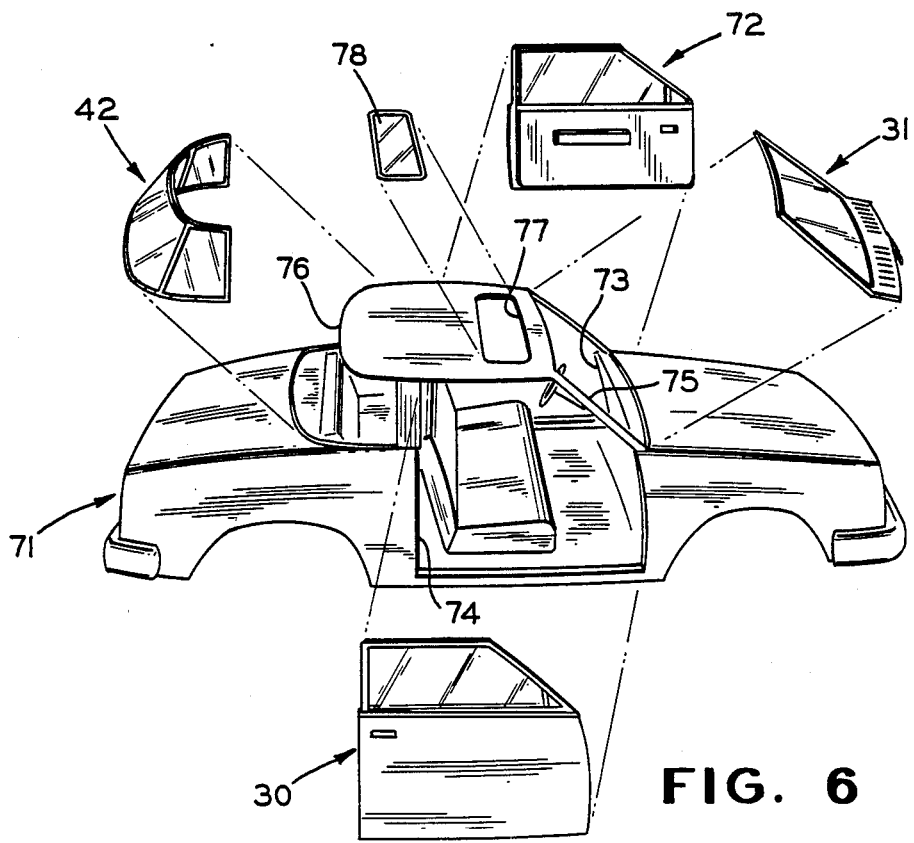
FIG. 6

METHOD OF ASSEMBLING A VEHICLE FROM MODULAR COMPONENTS

BACKGROUND OF THE INVENTION

The present invention relates generally to a method of assembling a vehicle and in particular to the use of modular glass components in the assembly of a vehicle.

Initially, fixed window assemblies for vehicles were comprised of a plurality of elements including adhesive sealants applied around the marginal edges of a glass sheet, suitable mechanical fasteners such as metal clips, and exterior decorative trim strips disposed to cover the junction between the marginal edges of the glass sheet and the adjacent portions of the vehicle frame. Such window structures were costly, especially from a labor standpoint, since it was necessary to assemble the individual elements along the vehicle assembly line.

Subsequently, in an endeavor to improve the above window structure, unitary window assemblies of the type illustrated in U.S. Pat. No. 4,072,340 were developed. These assemblies included a sheet of glass, an adjacent frame, and a casing or gasket of molded material, such as polyvinyl chloride, extending between the frame and the peripheral edge of the window to hold the sheet of glass and the frame together. Fasteners were provided at spaced locations along the frame such that the entire assembly could be guided into location over the opening in a vehicle body as a unit. Other types of unitary window assemblies are disclosed in U.S. Pat. Nos. 3,759,004 and 4,364,595. While such unitary window structures greatly reduce the time required to mount the window assembly in the associated vehicle, such structures are relatively costly since the individual components required to produce each window assembly generally must be manually assembled.

Also, there were endeavors to improve hinged window structures in vehicles. For example, U.S. Pat. No. 4,139,234 discloses a window assembly which includes a molded plastic casing or gasket around the peripheral edge of a transparent window and an attachment member. The attachment member may be a continuous rigid frame concealed from view from the outside of the assembly and having a portion embedded within a casing and a portion extending from the casing from which the entire assembly is secured to the vehicle body. Alternately, separate attaching members can be embedded within the casing. The casing may be molded around only one edge of the window thereby forming a flexible resilient hinge allowing the window to be moved between open and closed positions.

U.S. Pat. No. 4,363,191 discloses a hinged window assembly having a rigid support with a base fastened to the upper side of a window frame and a depending flange with a free edge. An edge molding strip envelopes the periphery of the window pane and includes a flexible hinge segment with one portion adhered to the support flange adjacent the free edge thereof to pivotly mount the window pane in the frame.

European patent application No. 0145354, published June 19, 1985, discloses a window gasket assembly in which the gasket is integrally molded from an elastomeric material such as urethane, and at least a portion of which is simultaneously bonded onto at least one substantially transparent window panel. The gasket and window assembly can then be mounted and bonded or secured directly to a vehicle body panel opening with adhesives, thereby eliminating the need for discreet mechanical fasteners, with at least one window panel being hingedly and pivotally attached to the vehicle body panel.

As vehicle become more streamlined, there is an increased demand for curved, fixed glass panels which conform to the body shape. Previously, such panels had to formed of a single sheet of glass and any substantial deviation from flat tended to produce optical distortion. Furthermore, there is a demand for reducing the labor costs associated with assembling a car. One solution is a window assembly shown in U.S. Pat. No. 4,332,413 for modifying the appearance of a vehicle body. A glass fiber reinforced polyester panel adapted to bridge a body opening has at least one opening smaller and of a different configuration than the body opening. A peripheral rabbet projects into the smaller opening and an insert is positioned in the smaller opening and held in place by an injection moldable elastomeric material that interlocks the periphery of the insert with the rabbet. The insert may be a window pane, a louvered panel, a lamp housing lens, or other substantially planar article.

SUMMARY OF THE INVENTION

The present invention relates to a method of assembling a vehicle utilizing modular glass structures to reduce the assembly time and cost. Each assembly includes one or more glass sheets upon which a gasket has been formed by in situ curing of a polymeric gasket forming material to encapsulate the marginal peripheral edge portion of the sheet. The gasket is typically formed by a reaction injection molding process.

The modular assembly is formed in a mold structure which includes at least two cooperating mold sections each having a recessed portion formed therein in facing relationship to one another. The recessed portions cooperate to define a sheet receiving chamber for receiving sheets of transparent material such as glass. A compressible seal means is positioned about at least a portion of the periphery of the chamber and functions to resiliently support the glass sheets within the chamber. Each mold section includes a metallic (or other suitable material) main body portion, and a seal means maintains the glass sheets in spaced apart relationship with the main body portions of the mold sections to prevent any glass-to-metal contact between the glass sheets and metallic mold sections.

Also, the seal means cooperates with predetermined portions of the glass sheet and mold sections for defining the gasket cavity having a configuration corresponding to the gasket to be formed on the glass sheets. The facing surfaces of the mold sections disposed outwardly of the gasket forming cavity are in metal-to-metal contact with one another. This enables the amount the seal means is compressed and the dimensions of the gasket to be precisely controlled. Inlet means or gates are provided for introducing a flowable gasket forming material into the gasket cavity. Alternatively, where two parts are being encapsulated together, the seal can be formed from a strip of sticky backed foam tape or elastomer attached to either of the parts. The seal then cooperates with the two parts to form a molding cavity between the parts.

The modular glass assembly can include, for example, two or more sheets of glass connected together with a hinge formed in the gasket by a reduced cross sectional area. The exterior surface of the hinge member is typically coplanar with the exterior surfaces of the adjacent portions of the gasket and the interior surface is recessed to form a normally U-shaped groove. Thus, the window assembly can be installed in the vehicle by bending along the hinge axis to fit the contour of the associated window opening. Such a modular assembly may include a back light, a pair of side lights, and a roof panel all connected by the gasket.

Another modular glass assembly can be a door glass assembly including a glass sheet having a gasket formed along at least one edge thereof and a bracket attached along at least one other edge thereof. The door glass assembly can be installed in a door to form a modular assembly which is then delivered to the vehicle body for assembly.

Another modular assembly can be a windshield assembly which includes an integral leaf screen and locator tab formed at the base of the windshield. Furthermore, the upper portion of the windshield can extend into and form a portion of the roof area and can include a sun roof panel hingedly attached to the assembly.

In the method according to the present invention, all of the above-described assemblies can be preformed and delivered to the vehicle body at the same time to be attached thereto thereby reducing the assembly time and cost.

BRIEF DESCRIPTION OF THE DRAWINGS

The above, as well as other advantages of the present invention, will become readily apparent to those skilled in the art from the following detailed description of a preferred embodiment when considered in the light of the accompanying drawings, in which:

FIG. 4 is a perspective view of an encapsulated hinged back window and side window assembly for use in the method according to the present invention;

FIG. 5 is an enlarged fragmentary sectional view of the window assembly of FIG. 4 taken along the line 5—5 thereof;

FIG. 6 is an exploded perspective view showing a vehicle body and various modular glass assemblies shown in FIGS. 1-5 for use with the method according to the present invention;

DESCRIPTION OF THE PREFERRED EMBODIMENTS

Figure 1:
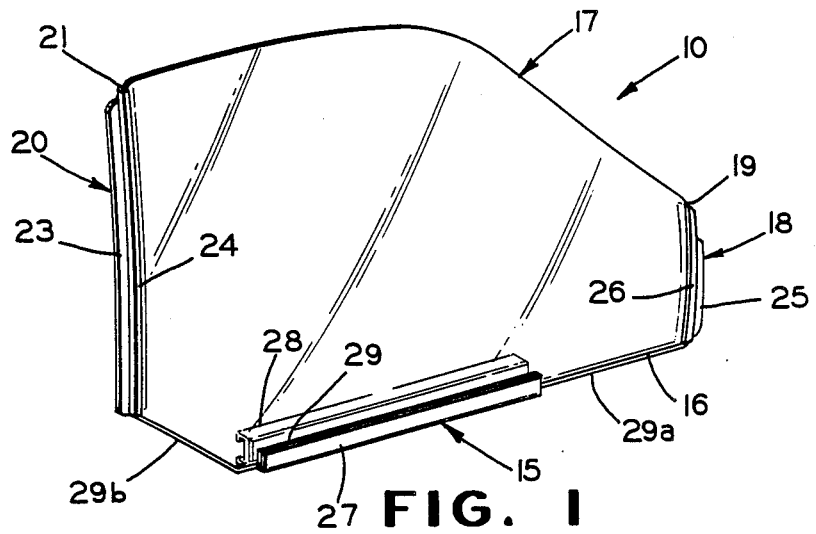
FIG. 1 is a perspective view of a door window assembly for use in the method according to the present invention.
Figure 2:
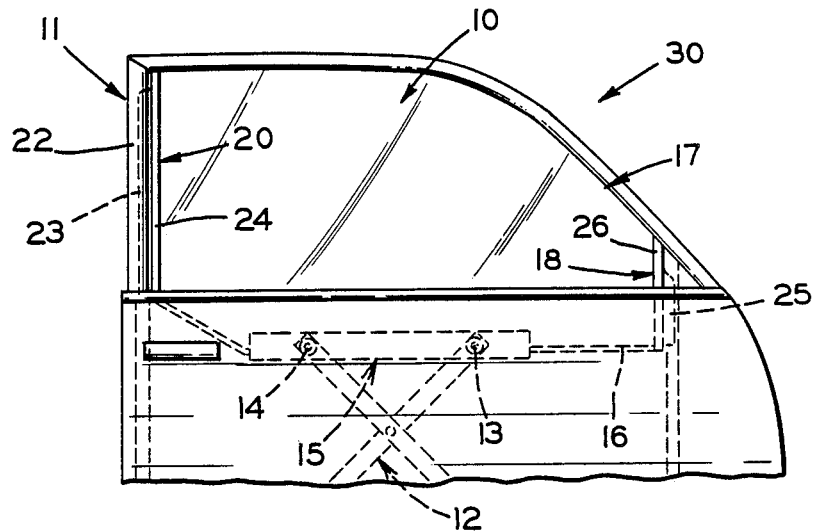
FIG. 2 is a front elevation view of the door window assembly of FIG. 1 installed in a door frame as a modular glass assembly for use in the method according to the present invention.

There is shown in FIG. 1 a window assembly 10 adapted to be installed in a vehicle door frame (not shown) to form a modular glass assembly for use in the method according to the present invention. A more detailed description of the window assembly and the method of making the same are found in U.S. patent application Ser. No. 794,019 entitled "WINDOW ASSEMBLY AND METHOD OF MAKING THE SAME". This application was filed Nov. 1, 1985, assigned to the assignee of this patent application and is incorporated herein by reference. As shown in FIG. 2, the window assembly 10 is installed in a front door 11 of a vehicle (not shown). A scissor linkage 12 is provided in the door 11 to raise and lower the window assembly 10. Linkage 12 may be of any conventional type and is shown in the raised position. The linkage 12 is pivotly connected at 13 and 14 to a bracket 15 attached to a lower edge 16 of a window 17 in the window assembly 10.

As shown in the drawings, front gasket 18 is attached to a front edge 19 of the window 17 and a rear gasket 20 is attached to a rear edge 21 of the window 17. The front door 11 of the vehicle includes a window frame having a rear section 22 formed to receive a flange member 23 formed on the gasket 20 as the window is raised and lowered. The flange member extends from a body portion 24 of the gasket 20 which encloses the rear edge 21 of the window 17 and is attached thereto for movement with the window as the linkage 12 raises and lowers the window assembly 10. The front gasket 18 is of similar construction with a flange member 25 and a body portion 26. The flange member 25 is accepted by a gasket (not shown) in a front section of the window frame.

The bracket 15 includes an angled, elongate plate member 27 secured to the lower end of a C-shaped channel member 28. The channel member 28 is formed to accept rollers (not shown) attached at the pivot points 13 and 14 of the linkage 12 to permit raising and lowering of the window assembly 10. The angle plate member 27 includes an upper L-shaped portion which cooperates with the side wall of the channel member 28 to define an upwardly facing channel for receiving a lower peripheral edge 16 of the window 17. The lower edge 16 is secured relative to the bracket 15 by a U-shaped gasket 29. The gaskets 18, 20 and 29 are all simultaneously molded in situ to the window 17 and the bracket 15. In addition, the gasket 29 can have a portion 29a molded along the lower edge 16 between the bracket 15 and the front gasket 18. Also, a portion 29b can be molded on the lower edge 16 between the bracket 15 and the rear gasket 20. After the door window assembly 10 has been formed with the gaskets and bracket, it can be assembled into the front door 11 to form a modular door assembly 30 for use in assembling a vehicle. Alternatively, the bracket 15, or portions thereof, can be formed of molding material at the same time the gaskets are formed.

Figure 3:
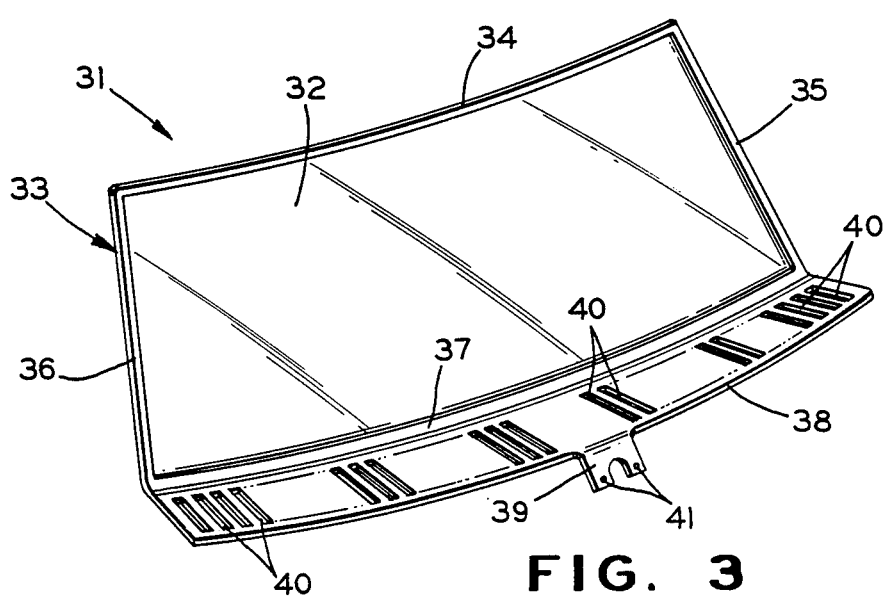
FIG. 3 is a perspective view of an encapsulated windshield and leaf screen for use in the method according to the present invention.

There is shown in FIG. 3 a modular windshield assembly 31 including a glass sheet 32 having its peripheral edges encapsulated by a gasket 33. The gasket 33 includes a top portion 34, side portions 35 and 36, and a bottom portion 37 which portions completely encapsulate the peripheral edges of the glass sheet 32. Attached to the bottom portion 37 is an integral leaf screen 38 and a locating tab means 39 extends from a front edge of the leaf screen 38. The leaf screen 38 replaces the prior art leaf screens which were typically formed of wire mesh, stamped steel or molded rigid plastic. These screens are utilized to prevent debris from falling into the engine compartment between the hood and body of those vehicles having windshield wipers mounted in the area. In order to provide for the passage of air between the exterior of the vehicle and the engine compartment, a plurality of elongated slots or apertures 40 are typically formed in the leaf screen 38.

The gasket portions 34, 35, 36 and 37 completely encapsulate the peripheral edge of the glass sheet 32 to provide a seal against the intrusion of fluids between the windshield and the frame of the vehicle in which it is installed. Thus, the windshield assembly 31 is typically fitted into an opening in the vehicle and the gasket 33 is secured to the vehicle with a suitable adhesive. The leaf screen 38 is formed integral with the remaining portions of the gasket 33 and at the proper angle such that it fills an opening between the body of the vehicle and the hood of the vehicle. The tab means 39 can include one or more apertures 41 for receiving fastening means to secure the leading edge of the leaf screen, typically to the body of the vehicle. The leaf screen 38 and/or the tab 39 also can be formed of metal, plastic or any suitable material and attached to the glass sheet 32 with the gasket 33.

Such a modular assembly is disclosed along with a method of forming the same in U.S. patent application Ser. No. 812,727 entitled "WINDSHIELD AND LEAF SCREEN ASSEMBLY AND METHOD OF MAKING THE SAME". This application was filed on Dec. 23, 1985, is assigned to the assignee of this application, and is incorporated herein by reference.

There is shown in FIG. 4 a modular rear window assembly 42 including a pair of side or rear quarter panel windows 43 and 44 joined to either side of a rear window 45. The windows 43, 44 and 45 can be formed of flat or curved sheets of transparent material as shown. In either case, the final configuration of the window assembly 42 would be difficult, if not impossible, to achieve with a single sheet of transparent material.

The edges of the windows are encapsulated by a gasket 46 which also forms a hinge connecting the rear window 45 at one side to the side window 43 and at the other side of the side window 44. For example, side window 43 is encapsulated along the top edge by a top edge portion gasket 47, is encapsulated along one side edge by side edge portion gasket 48, and is encapsulated along a bottom edge by a bottom edge portion gasket 49. The opposite side edge of the side window 43 is encapsulated by a hinge portion gasket 50 which also encapsulates an adjacent side edge of the rear window 45. The top edge of the rear window 45 is encapsulated by a top edge gasket portion 51 and the bottom edge of the rear window 45 is encapsulated by a bottom edge portion gasket 52. The top edge of the side window 44 is encapsulated by a top edge portion gasket 53, a side edge of the window 44 is encapsulated by a side edge portion gasket 54, and a bottom edge portion gasket 55 encapsulates the bottom edge of the side window 44. The other side edge of the side window 44 is attached to an adjacent side edge of the rear window 45 by a side edge portion gasket 56.

As shown in FIG. 5, an enlarged fragmentary cross-sectional view taken along the line 5—5 of FIG. 4, the side edge gasket 48 wraps around and completely encloses a side edge portion 57 of the side quarter panel window 43. The gasket 48 is representative of the gasket portions 47, 49, 51, 52, 53, 54, and 55. The gasket portion 50 is formed with two edge enclosing portions 58 and 59 joined by a narrow cross-section hinge portion 60. The side portions 58 and 59 are similar in cross-section to the side portion 48. The side portion 58 encapsulates an edge portion 61 of the side window 43 and the side portion 59 encapsulates an edge 62 of the rear window 45. The hinge portion 50 permits relative angular movement between the side window 43 and the rear window 45 during manufacture, shipping and installation. Thus, the side windows 43 and 44 and the rear window 45 can be formed in separate operations and then assembled together with the molded gasket 46 into a more complex configuration which is easier to install into a vehicle. The gasket 46 also seals against the intrusion fluid such as wind and rain between the glass windows and the body of the vehicle.

As shown in FIG. 5, the hinge portion 60 is formed with an outer surface 63 which is substantially coplanar with outer surfaces 64 and 65 of the side portions 58 and 59 respectively. An inner surface 66 of the hinge portion 60 is substantially recessed from the inner surfaces 67 and 68 of the side portions 58 and 59 respectively to form a substantially U-shaped groove 69 extending the length of the side edge gasket portion 50. As the side window 43 is moved in the direction of an arrow 70, the groove 69 becomes narrower, but the outer surface 63 remains substantially the same to provide a smooth appearance on the exterior of the vehicle.

The modular rear window assembly 42 shown in FIGS. 4 and 5 is disclosed in more detail along with the method of making the same in U.S. patent application Ser. No. 853,399 entitled "HINGED WINDOW ASSEMBLY AND METHOD OF MAKING THE SAME". This application was filed on Apr. 18, 1986, is assigned to the assignee of the present application, and is incorporated herein by reference.

As stated above, parts formed of metal, plastic or any other suitable material can be attached to a glass panel utilizing the gasket material. For example, rigid plastic parts made from a thermoplastic such as polyvinyl chloride (PVC) and/or parts formed from a rubber-like terpolymer (EPDM) can be placed in a mold with one or more glass sheets and partially or fully encapsulated with gasket material to form a modular unit.

There is shown in FIG. 6 an exploded perspective view of a vehicle body 71 and various modular window assemblies to be installed on said body in accordance with the method of the present invention. The modular assemblies include a driver's door and window assembly 72, a complementary passenger's door and window assembly 30, a windshield and leaf screen assembly 31, and a rear window assembly 42. The vehicle body includes corresponding openings for receiving the various assemblies such as a driver's door opening 73 for receiving the modular door assembly 72, a passenger's door opening 74 for receiving the modular passenger door assembly 30, a windshield opening 75 for the modular windshield 31, and a rear window opening 76 for the modular rear window assembly 42. In addition, an opening 77 can be formed in a roof of the vehicle body 71 to accept a sun roof assembly 78 of any of many commercially available types. Each of the modular window assemblies 30, 31, 42, 72 and 78 are manufactured separately and then brought to a vehicle assembly line to be installed on the vehicle body 71 at the appropriate time.

As the automotive stylist creates cars having more glass area, the use of modular window assemblies according to the present invention will enable the manufacture of a vehicle having all glass panels above the belt line. The panels can be formed of clear glass, tinted glass, and glass having one or both surfaces coated with an opaque or semi-transparent material, and panels which open and close. There is shown in FIGS. 7 through 10 an alternate embodiment of various modular window assemblies utilized in the method according to the present invention.

Figure 7:
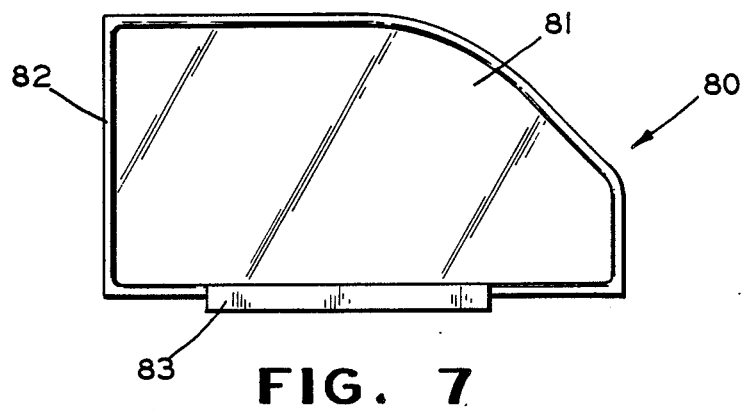
FIG. 7 is a front elevational view of an alternate embodiment of the door window assembly of FIG. 1.
Figure 10:
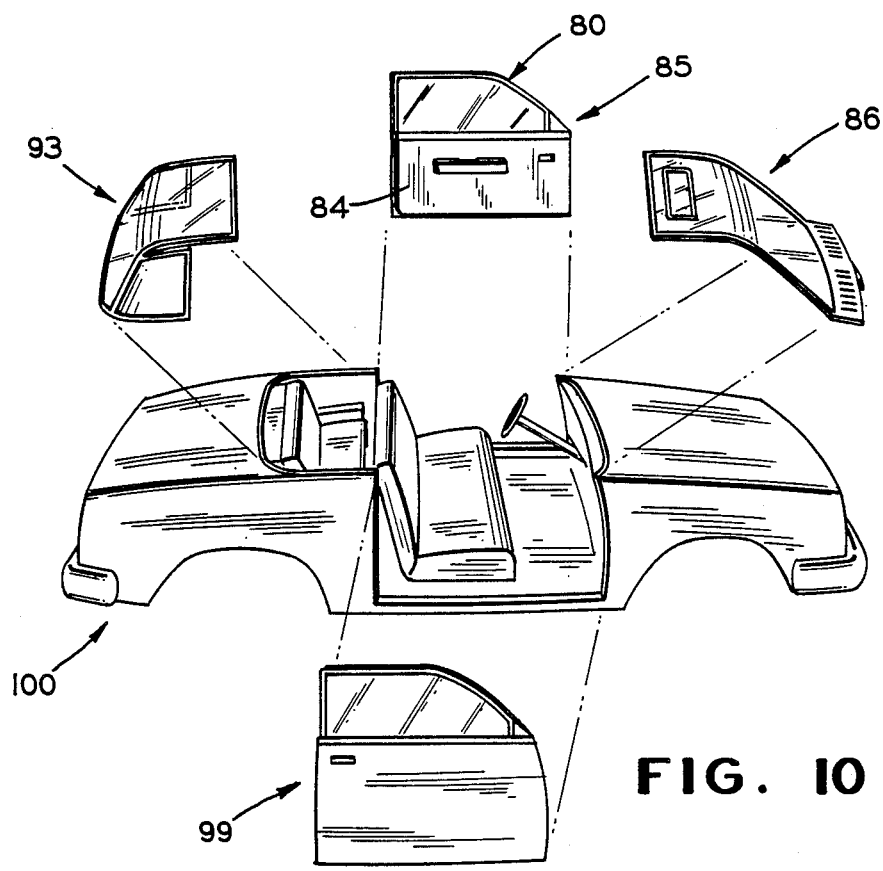
FIG. 10 is an exploded perspective view of a vehicle body and various modular assemblies shown in FIGS. 6-8 for use with the assembly method according to the present invention.

There is shown in FIG. 7 a door window assembly 80 which includes a sheet of glass 81 having its peripheral edges encapsulated in a gasket material 82. A bracket 83 can be attached to the glass sheet 81 by the gasket material 82 for connection with a window raising and lowering mechanism such as the one shown in FIG. 2. The window assembly 80 can be attached to a driver's door 84 to form a modular door assembly 84 as shown in FIG. 10. The door 84 does not include an upper frame for surrounding the peripheral edge of the window assembly 80 although such a frame could be provided as shown in FIG. 2.

Figure 8:
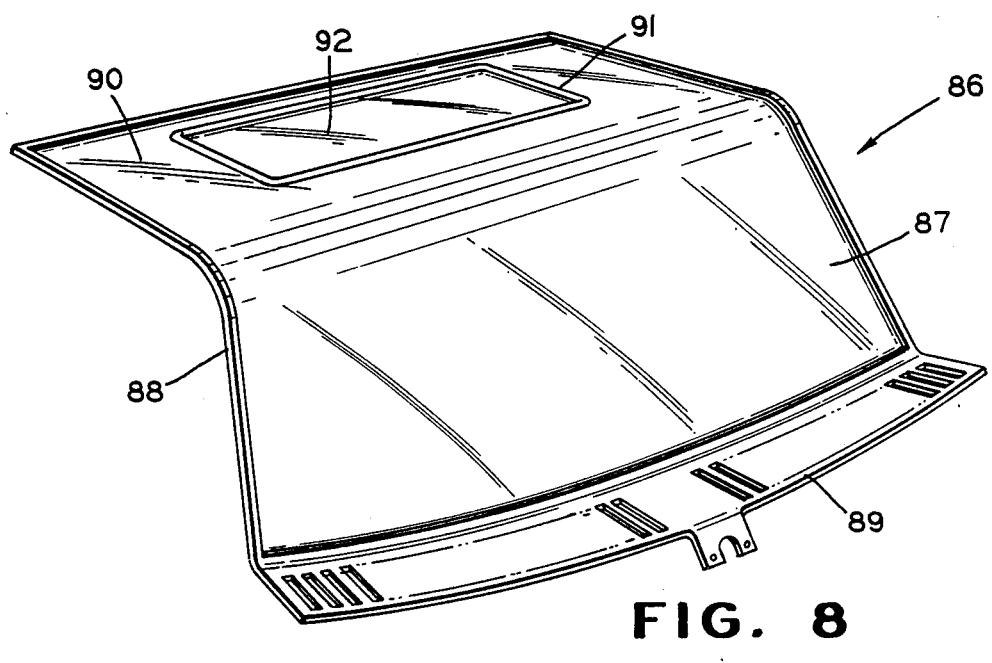
FIG. 8 is a perspective view of an alternate embodiment of the encapsulated windshield and leaf screen of FIG. 3.

There is shown in FIG. 8 an alternate embodiment modular windshield assembly 86. The assembly 86 includes a glass windshield 87 having its peripheral edge encapsulated in a gasket 88. A leaf screen 89 is formed integral with a bottom edge portion of the gasket 88. The windshield also includes an upper portion 90 which is formed to extend over a forward portion of the passenger compartment of a vehicle when the windshield assembly 86 is installed in a vehicle body. There is formed in the upper portion 90 an aperture having its peripheral edge portion encapsulated in a gasket 91. The opening is closed by a glass panel or sun roof 92 which can have one of its edges, preferably the front edge, encapsulated by the gasket 91 to form a hinge thereby allowing the rear edge of the sun roof 92 to be raised. Thus, the gasket and hinge 91 serves to seal the opening when the sun roof 92 is closed and functions as a hinge to allow movement of the sun roof 92 when it is desired to open the sun roof. Of course, the gaskets 88 and 91 and the leaf screen 89 can be formed on the windshield 87 and the sun roof 92 in a single molding process as previously described.

Figure 9:
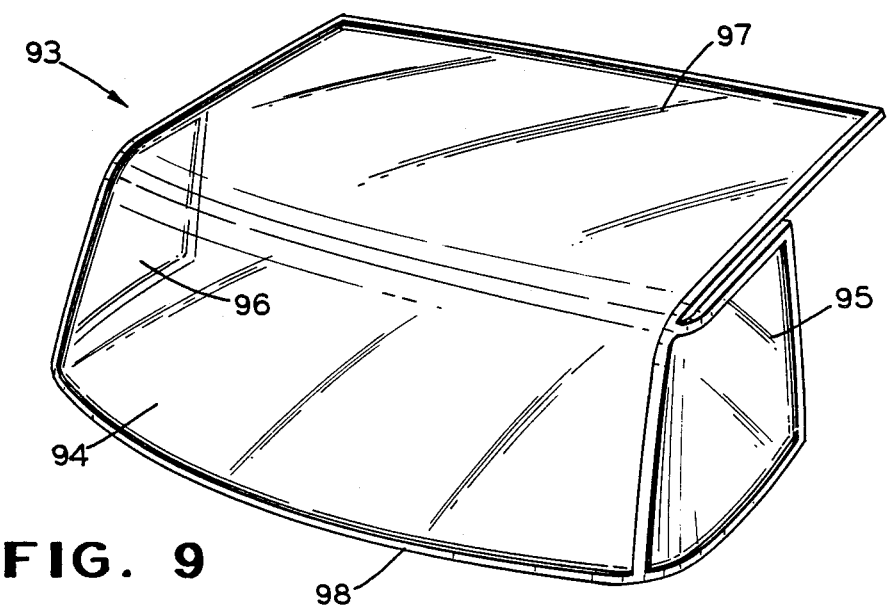
FIG. 9 is a perspective view of an alternate embodiment of the encapsulated back window and side windows of FIG. 4.

There is shown in FIG. 9 a modular rear window assembly 93. The assembly 93 includes a rear window 94, side or rear quarter windows 95 and 96, and a roof panel 97 all formed of glass sheets. The windows 94, 95, 96 and 97 are joined together by a gasket and hinge 98 which encapsulates the peripheral edges of all of the panels. If the panels and the gasket are not formed in the final position shown in FIG. 9, it will be necessary to connect some of the panels together with a hinge portion gasket and then seal abutting gasket portions after the assembly has been installed in the vehicle body.

There is shown in FIG. 10 the modular windshield assembly 86, the modular rear window assembly 93, the modular driver's door assembly 85, and a complementary modular passenger's door assembly 99 positioned to be installed on a vehicle body 100. The assemblies 86 and 93 are constructed to abut gasketed edges to form a roof over the passenger compartment. The abutting edges can be sealed and the door window assemblies rolled up into engagement with the roof portion to form a fluid tight cover for the passenger compartment consisting of all glass panels above the belt line of the vehicle body. If necessary, either or both of the modular assemblies 86 and 93 could be formed with a strengthing means such as a roll bar which is attached to the vehicle body when the modular assemblies are installed. Alternatively, the roll bar could be installed on the vehicle body prior to the installation of the modular assembly.

Figure 11:
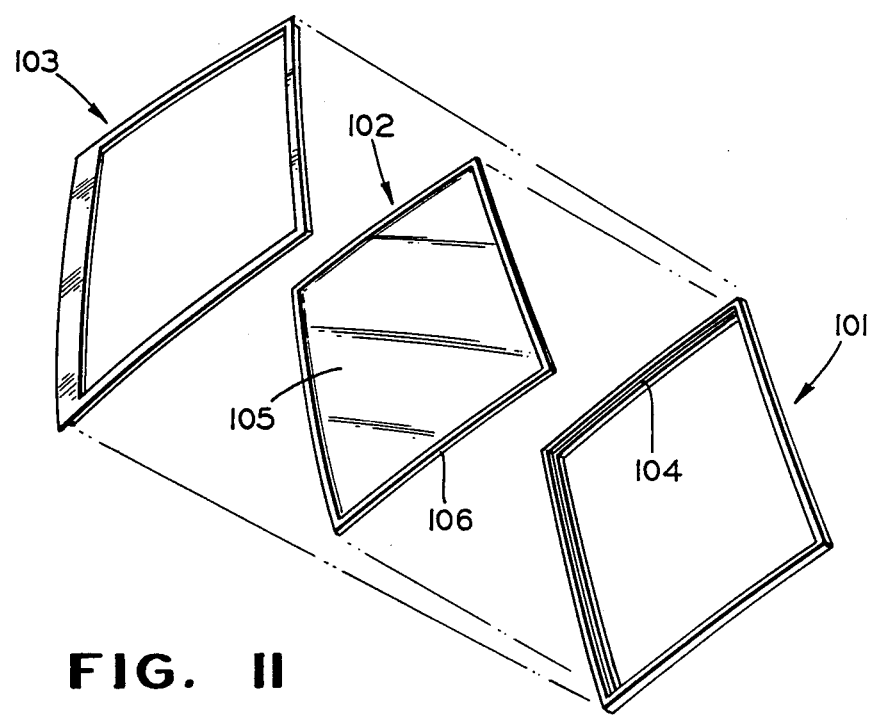
FIG. 11 is an exploded perspective view of another alternate embodiment of an encapsulated back window.

There is shown in FIG. 11 another alternate embodiment of an encapsulated back window for a vehicle. Many vehicles are of the popular lift back or hatch type. A modular assembly can be formed of an inner frame 101, a back window assembly 102 and an outer frame 103. The inner frame 101 includes a step 104 formed on an inner periphery of the frame upon which a peripheral edge portion of the back window assembly 102 rests. The outer frame 103 is then attached to the inner frame 101 to sandwich the back window assembly 102 between the two frames. The back window assembly 102 can be formed of a sheet of glass 105 and an encapsulating gasket portion 106. The gasket 106 can be formed on the glass sheet 105 in a separate operation as previously discussed or, it can be formed in a molding operation with the inner frame 101. In some instances, the sheet of glass 105 could be assembled with the inner frame 101 and the outer frame 103 forming a portion of a mold cavity. After all the parts have been assembled, hardware (not shown) for attaching the back window assembly to the vehicle can be installed.

In summary, the method according to the present invention involves the steps of producing a plurality of window assemblies including at least a windshield assembly, a rear window assembly, and a pair of door window assemblies and installing said assemblies in a vehicle body along a vehicle assembly line. The door window assembly can include a transparent sheet, a bracket means and a gasket adhered to the periphery of the sheet produced by a method including the steps of positioning a transparent sheet of material within the interior of a mold cavity formed by a plurality of cooperating die sections, said mold cavity having the shape and position, relative to the transparent sheet, of the ultimate gasket, and enclosing the marginal surfaces of the sheet immediately adjacent the periphery thereof; positioning said bracket means within the interior of said mold cavity; injecting into the mold cavity a composition which is capable of polymerization when cured to produce a gasket, and when cured in contact therewith, it adheres to the marginal surfaces of the sheet material and the bracket means; and removing the assembly from the mold cavity. The type of gasket material utilized will depend upon the application and can be polyurethane, polyurea, polyacrylamate or other suitable material.

The windshield assembly includes a transparent sheet having a first gasket member adhered to the peripheral portion thereof and a leaf screen formed as a second gasket member integral with the first gasket member produced according to a method including the steps of positioning a sheet of transparent material within the interior of a mold chamber formed by at least two cooperating mold sections; said mold sections provided with a gasket shaping portion which cooperates with a first peripheral portion of the sheet to define a first gasket forming cavity corresponding to a first gasket member to be formed and cooperates with a second peripheral portion of the sheet to define a second gasket forming cavity corresponding to a second gasket member to be formed; injecting into the first and second gasket forming cavities a composition which is capable of polymerization when cured and, when cured in contact with the sheet, it adheres thereto to produce the first and second gasket members; and removing the window assembly from the mold chamber. The rear window assembly includes at least a first and second sheet of transparent material and a gasket adhered to the sheets of transparent material including a hinge portion to permit relative movement between the first and second sheets.

The door window assembly is assembled into a door for a vehicle body. The windshield assembly, the rear window assembly and a pair of complementary door window assemblies are then transported to a vehicle assembly line for installation on a vehicle body.

In accordance with the provisions of the patent statutes, the principle and mode of operation of the present invention have been described in what is considered to represent the preferred embodiment. However, it should be understood that the invention may be practiced otherwise than as specifically illustrated and described without departing from its spirit or scope.

What is claimed is:

1. A method of assembling a vehicle from a vehicle body and a plurality of modular window assemblies comprising the steps of:
   (a) positioning a sheet of transparent material within the interior of a mold chamber formed by at least two cooperating mold sections;
   said mold sections provided with a gasket shaping portion which cooperates with a first peripheral portion of the sheet to define a first gasket forming cavity corresponding to a first gasket member to be formed and cooperates with a second peripheral portion of the sheet to define a second gasket forming cavity corresponding to a second gasket member to be formed;
   (b) inserting a plug between said first and second cavities;
   (c) injecting into the first and second gasket forming cavities a composition which is capable of polymerization when cured and, when cured in contact with the sheet, it adheres thereto to produce the first and second gasket members by injecting said composition into one of said first and second gasket forming cavities, removing said plug and then injecting said composition into the other one of said first and second gasket forming cavities;
   (d) removing the sheet and the first and second gasket member as a modular window assembly from the mold chamber;
   (e) repeating at least steps (a), (c) and (d) to produce a plurality of modular window assemblies; and
   (f) attaching said plurality of modular window assemblies to a vehicle body to assemble a vehicle.

2. The method according to claim 1 wherein each one of said plurality of modular window assemblies is different.

3. The method according to claim 1 wherein said composition injected into one of said first and second gasket forming cavities is a different material than the composition injected into the other one of said first and second gasket forming cavities.

4. The method according to claim 1 wherein said sheet material is glass.

5. The method according to claim 1 wherein said gasket has been polymerized in situ adjacent said sheet and has assumed through the autogenous mechanism incident to its polmerization and cure while confined, intimate contact with the portions of said sheet to which it is adhered.

6. The method according to claim 1 wherein said gasket is formed of an elastomeric material.

7. The method according to claim 6 wherein said elastomeric material is a polyurethane material.

8. A method of assembling a vehicle from a vehicle body and a plurality of modular window assemblies comprising the steps of:
   (a) positioning a plurality of sheets of transparent material within the interior of at least one mold chamber formed by at least two cooperating mold sections;
   (b) said mold sections provided with a gasket shaping portion which cooperates with at least one peripheral portion of each of said sheets to define a plurality of gasket forming cavities corresponding to gasket members to be formed;
   (c) injecting into said gasket forming cavities a composition which cures in contact with and adheres to said sheets to produce said gasket members;
   (d) removing said sheets and said gasket members as a plurality of modular window assemblies; and
   (e) attaching said plurality of modular window assemblies to a vehicle body to assemble a vehicle.

9. The method according to claim 8 wherein said plurality of sheets includes a windshield and one of said modular window assemblies includes said windshield, a first one of said gasket members formed to encapsulate the peripheral edge portions of said windshield and a second one of said gasket members formed to extend from a portion of said first gasket member as a leaf screen.

10. The method according to claim 8 wherein said plurality of sheets includes a windshield and a sun roof and one of said modular window assemblies includes said windshield having an aperture formed therein and said sun roof, a first one of said gasket members formed to encapsulate a first peripheral edge portion of said aperture and, a second one of said gasket members adhered to a second peripheral portion of said aperture and a first peripheral portion of said sun roof to form a hinge.

11. The method according to claim 8 wherein step (a) includes positioning at least a pair of brackets into said mold chamber, said plurality of sheets includes at least one vehicle driver's door window and at least one vehicle passenger's door window, one of said modular window assemblies includes said driver's door window, one of said brackets and one of said gasket members adhered to said driver's door window and said one bracket, and another of said modular window assemblies includes said passenger's door window, another of said brackets and another of said gasket members adhered to said passenger's door window and said another bracket.

12. The method according to claim 8 wherein said plurality of sheets includes a vehicle rear window and a pair of vehicle side windows and one of said modular window assemblies includes said rear and side windows adhered to at least one of said gasket members.

13. The method according to claim 12 wherein said plurality of sheets includes a vehicle roof panel and said one modular window assembly includes said roof panel and said rear window adhered to another of said gasket members.

14. A method of assembling a vehicle from a vehicle body and a plurality of modular window assemblies comprising the steps of:

(a) positioning a sheet of transparent material within the interior of a mold chamber formed by at least two cooperating mold sections;

(b) said mold sections provided with a gasket shaping portion which cooperates with a first peripheral portion of the sheet to define a first gasket forming cavity corresponding to a first gasket member to be formed and cooperates with a second peripheral portion of the sheet to define a second gasket forming cavity corresponding to a second gasket member to be formed;

(c) injecting into the first and second gasket forming cavities a composition which is capable of polymerization when cured and, when cured in contact with the sheet, it adheres thereto to produce the first and second gasket members;

(d) removing the sheet and the first and second gasket members as a modular window assembly from the mold chamber;

(e) repeating steps (a) through (d) to produce a plurality of modular window assemblies wherein for at least one of said modular window assemblies step (a) includes positioning at least first, second and third sheets of transparent material within the interior of said mold chamber, step (b) includes a gasket shaping portion cooperating with a first peripheral portion of each of first and second sheets to define said first gasket forming cavity and cooperating with a second peripheral portion of said first sheet and a first peripherial portion of said third sheet to define said second gasket forming cavity, step (c) includes injecting a composition which cures in contact with said first, second and third sheets and adheres thereto, and step (d) includes removing said first, second and third sheets and said first and second gasket members as said modular window assembly; and (f) attaching said plurality of modular window assemblies to a vehicle body to assemble a vehicle.

15. The method according to claim 14 wherein said first sheet is a vehicle rear window and said second and third sheets are vehicle side windows.

16. The method according to claim 14 wherein said first sheet is a vehicle rear window, said second sheet is a vehicle side window and said third sheet is a vehicle roof panel.

17. The method according to claim 14 wherein at least one of said first and second gasket members has a generally planar outer surface and an interior surface recessed to form a generally U-shaped groove.

18. A method of assembling a vehicle from a vehicle body and a plurality of modular window assemblies comprising the steps of:
(a) positioning a sheet of transparent material within the interior of a mold chamber formed by at least two cooperating mold sections;

(b) said mold sections provided with a gasket shaping portion which cooperates with a first peripheral portion of the sheet to define a first gasket forming cavity corresponding to a first gasket member to be formed and cooperates with a second peripheral portion of the sheet to define a second gasket forming cavity corresponding to a second gasket member to be formed;

(c) injecting into the first and second gasket forming cavities a composition which is capable of polymerization when cured and, when cured in contact with the sheet, it adheres thereto to produce the first and second gasket members;

(d) removing the sheet and the first and second gasket members as a modular window assembly from the mold chamber;

(e) repeating steps (a) through (d) to produce a plurality of modular window assemblies wherein for at least one of said modular window assemblies step (a) includes positioning at least a second sheet of transparent material within the interior of the mold chamber, step (b) includes said gasket shaping portion cooperating with a first peripheral portion of one of said sheets to define said first gasket forming cavity and cooperating with a second peripheral portion of said one sheet and a first peripherial portion of said second sheet to define said second gasket forming cavity, step (c) includes injecting a composition which cures in contact with said one sheet and said second sheet and adheres thereto, and step (d) includes removing said second sheet from the mold chamber with said one sheet and said first and second gasket members as said one modular window assembly; and (f) attaching said plurality of modular window assemblies to a vehicle body to assemble a vehicle.

19. The method according to claim 18 wherein said second gasket member includes a first member extending along a first portion of the peripheral edge of said one transparent sheet, said first member adhered to said one transparent sheet, a second member spaced from said first member and extending along and adhered to a portion of the peripheral edge of said second transparent sheet, and a third member of reduced cross sectional area connecting said first and second members together whereby said third member permits relative movement between said one and second sheets of transparent material, said second gasket member having an external surface of each of said first, second and third members coplanar to form a relatively smooth external surface of said second gasket member.

20. The method according to claim 19 wherein said one sheet is a vehicle rear window and said second sheet is a vehicle side window.

21. The method according to claim 19 wherein said one sheet is a vehicle rear window and said second sheet is a vehicle roof panel.

22. The method according to claim 19 wherein said one sheet is a vehicle windshield and said second sheet is a vehicle sun roof panel.

23. The method according to claim 19 wherein an internal surface of said third member is recessed with respect to an internal surface of said first and second members to form a generally U-shaped groove in an internal surface of said second gasket member.

24. A method of assembling a vehicle from a vehicle body and a plurality of modular window assemblies comprising the steps of:
(a) positioning a sheet of transparent material within the interior of a mold chamber formed by at least two cooperating mold sections;

(b) said mold sections provided with a gasket shaping portion which cooperates with a first peripheral portion of the sheet to define a first gasket forming cavity corresponding to a first gasket member to be formed and cooperates with a second peripheral portion of the sheet to define a second gasket forming cavity corresponding to a second gasket member to be formed;

(c) injecting into the first and second gasket forming cavities a composition which is capable of polymerization when cured and, when cured in contact with the sheet, it adheres thereto to produce the first and second gasket members;

(d) removing the sheet and the first and second gasket members as a modular window assembly from the mold chamber;

(e) repeating steps (a) through (d) to produce a plurality of modular window assemblies wherein for at least one of said modular window assemblies step (b) includes positioning a bracket means along the periphery of the transparent sheet within the interior of the mold chamber, said gasket shaping portion cooperating with said first peripherial portion of the sheet and the bracket means to define said first gasket forming cavity, and step (c) includes a composition which when cured in contact with said bracket means adheres thereto to produce said first gasket member; and (f) attaching said plurality of modular window assemblies to a vehicle body to assemble a vehicle.

25. The method according to claim 24 wherein said sheet is a vehicle door window and including a step of attaching said one modular window assembly to a vehicle door by connecting said bracket means to a window actuating mechanism associated with said vehicle door before performing step (f).

26. The method according to claim 24 wherein said bracket means is metal.

27. The method according to claim 26 wherein said gasket includes a rib portion extending along and adhered to the peripheral edge of said sheet, said rib portion connecting said first member of said gasket to said second member of said gasket.

28. A method of assembling a vehicle from a vehicle body and a plurality of modular window assemblies comprising the steps of:

(a) positioning a sheet of transparent material within the interior of a mold chamber formed by at least two cooperating mold sections;

(b) said mold sections provided with a gasket shaping portion which cooperates with a first peripheral portion of the sheet to define a first gasket forming cavity corresponding to a first gasket member to be formed and cooperates with a second peripheral portion of the sheet to define a second gasket forming cavity corresponding to a second gasket member to be formed;

(c) injecting into the first and second gasket forming cavities a composition which is capable of polymerization when cured and, when cured in contact with the sheet, it adheres thereto to produce the first and second gasket members;

(d) removing the sheet and the first and second gasket members as a modular window assembly from the mold chamber;

(e) repeating steps (a) through (d) to produce a plurality of modular window assemblies wherein for at least one of said modular window assemblies said first gasket member is formed to encapsulate the peripheral edge portions of said transparent sheet material and said second gasket member is formed to extend from a portion of said first gasket member as a leaf screen; and (f) attaching said plurality of modular window assemblies to a vehicle body to assemble a vehicle.

29. The method according to claim 28 wherein a plurality of elongated slots are formed in said second gasket member during step (c).

30. A method of assembling a vehicle from a vehicle body and a plurality of modular window assemblies comprising the steps of:

(a) positioning a sheet of transparent material within the interior of a mold chamber formed by at least two cooperating mold sections;

(b) said mold sections provided with a gasket shaping portion which cooperates with a first peripheral portion of the sheet to define a first gasket forming cavity corresponding to a first gasket member to be formed and cooperates with a second peripheral portion of the sheet to define a second gasket forming cavity corresponding to a second gasket member to be formed;

(c) injecting into the first and second gasket forming cavities a composition which is capable of polymerization when cured and, when cured in contact with the sheet, it adheres thereto to produce the first and second gasket members;

(d) removing the sheet and the first and second gasket members as a modular window assembly from the mold chamber;

(e) repeating steps (a) through (d) to produce a plurality of modular window assemblies wherein for at least one of said modular window assemblies said gasket shaping portion of said mold sections includes a third gasket forming cavity adjacent said second gasket forming cavity, and step (c) includes injecting said composition into said third cavity to form a third gasket member as a tab extending from said second gasket member of said gasket; and (f) attaching said plurality of modular window assemblies to a vehicle body to assemble a vehicle.

31. The method according to claim 30 including forming at least one aperture in said tab during step (c).

* * * * *